Jan. 20, 1953 L. G. SIMJIAN 2,625,857
POSE-REFLECTING PHOTOGRAPHIC APPARATUS
Filed July 26, 1949 3 Sheets-Sheet 1
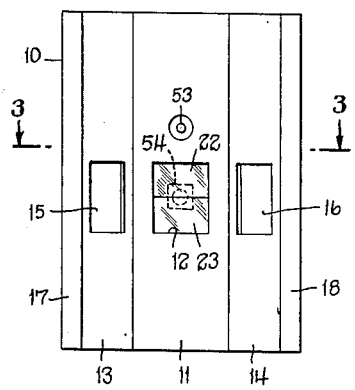
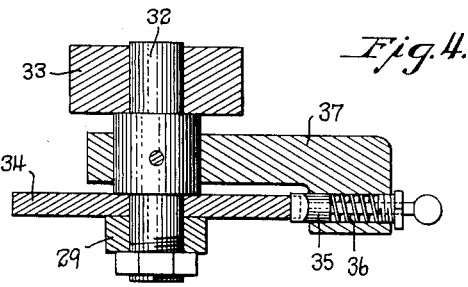
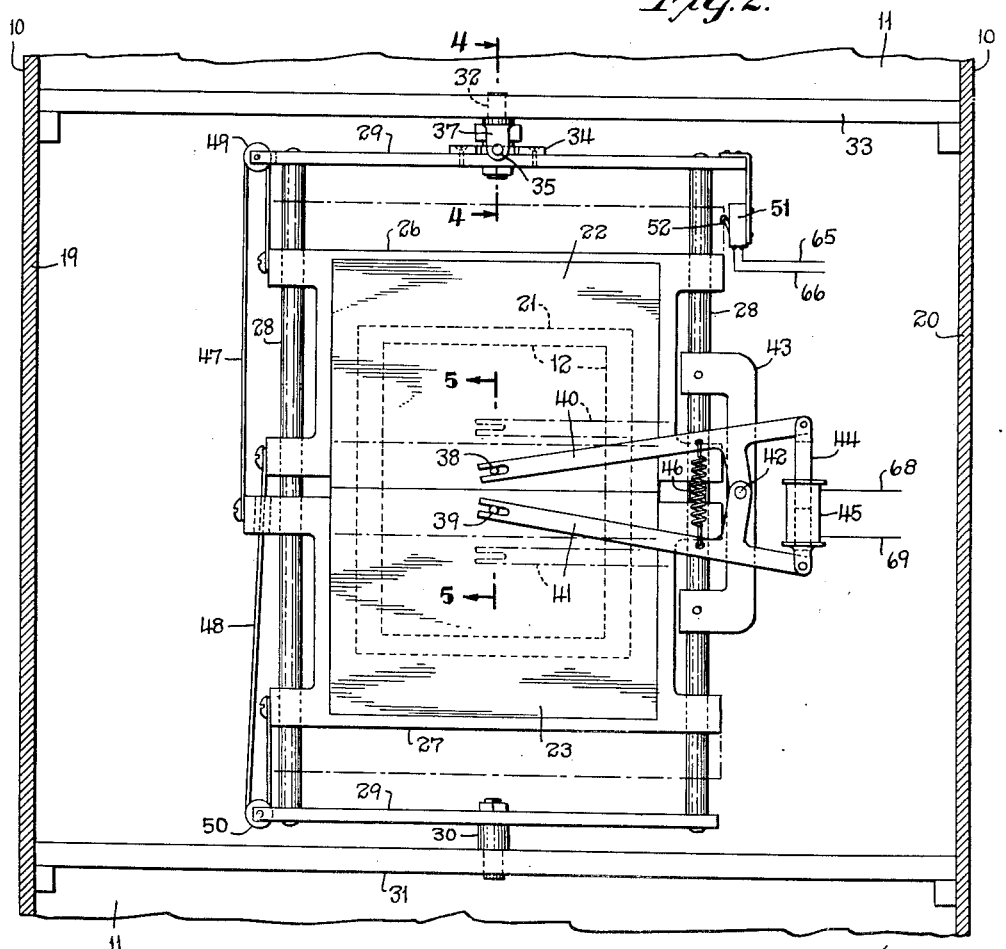
Inventor
Luther G. Simjian
By Seymour Earl Nichols
Attorneys Jan. 20, 1953
L. G. SIMJIAN
2,625,857
POSE-REFLECTING PHOTOGRAPHIC APPARATUS
Filed July 26, 1949
3 Sheets-Sheet 2
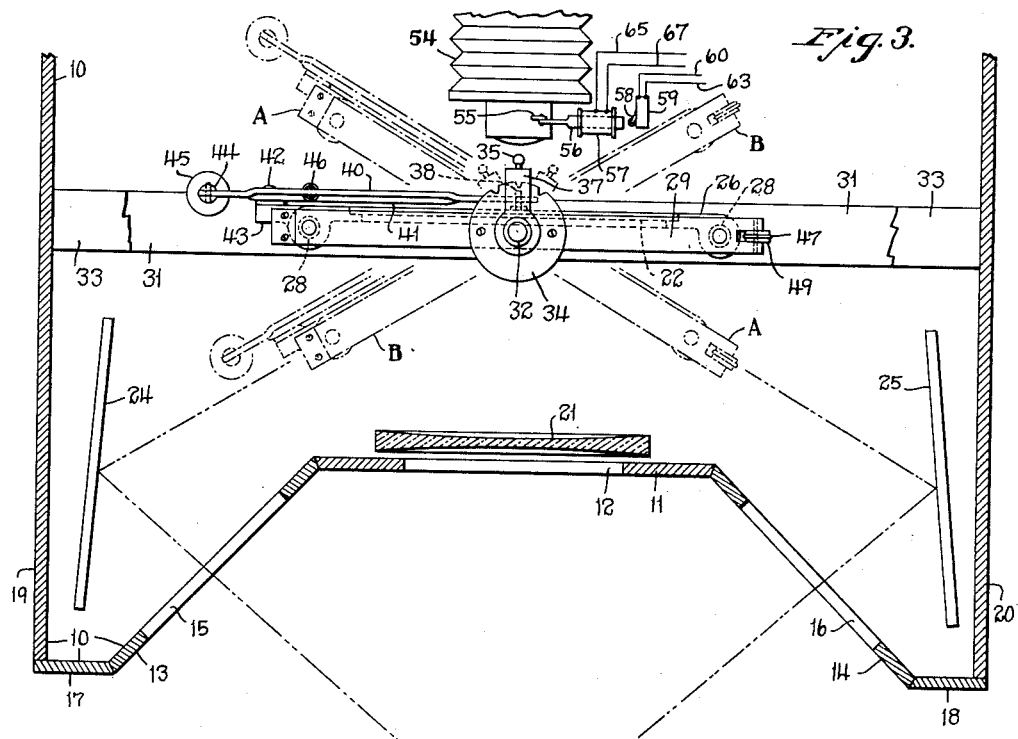
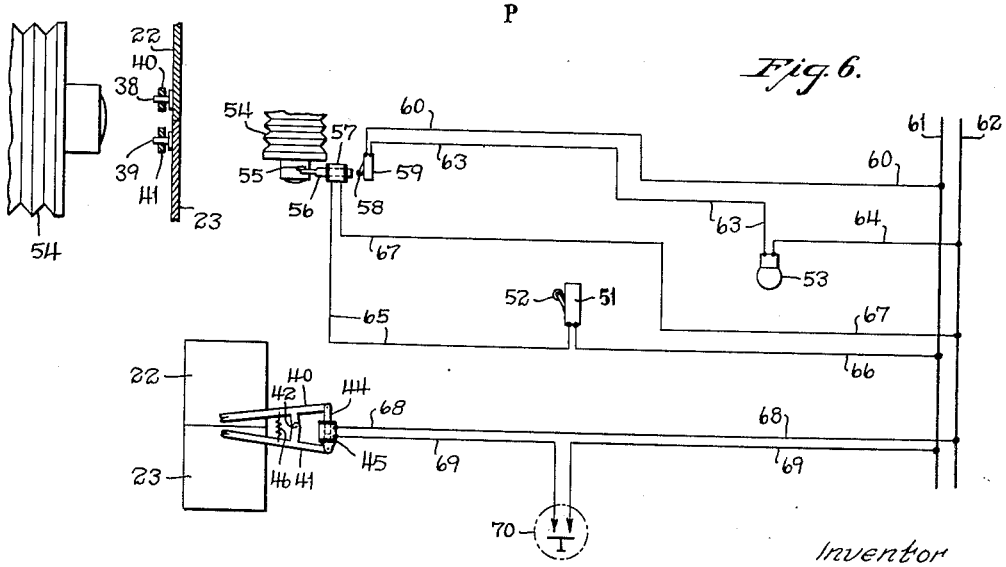
Inventor
Luther G. Simjian
By Seymour Earl Nichols
Attorneys Jan. 20, 1953        L. G. SIMJIAN        2,625,857
POSE-REFLECTING PHOTOGRAPHIC APPARATUS
Filed July 26, 1949        3 Sheets-Sheet 3
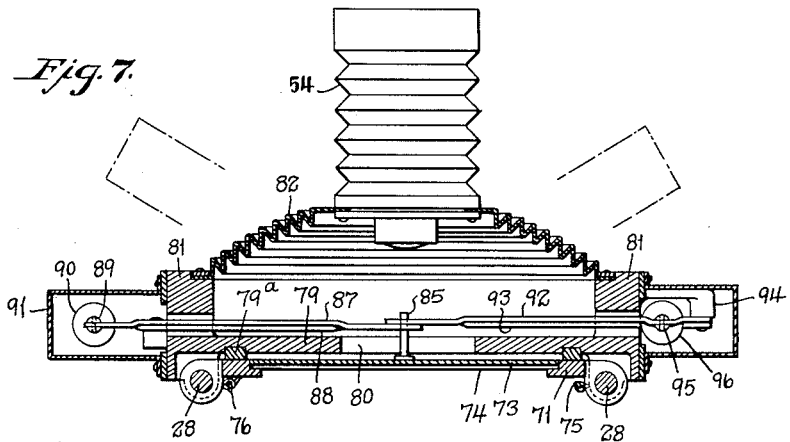
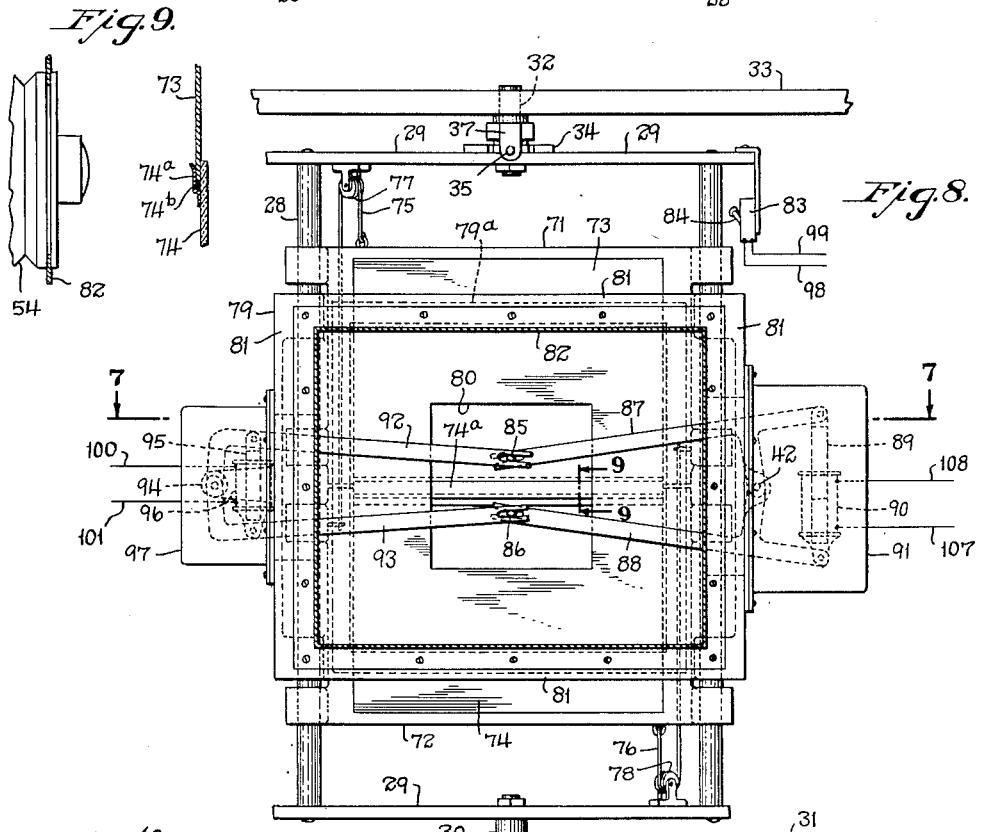
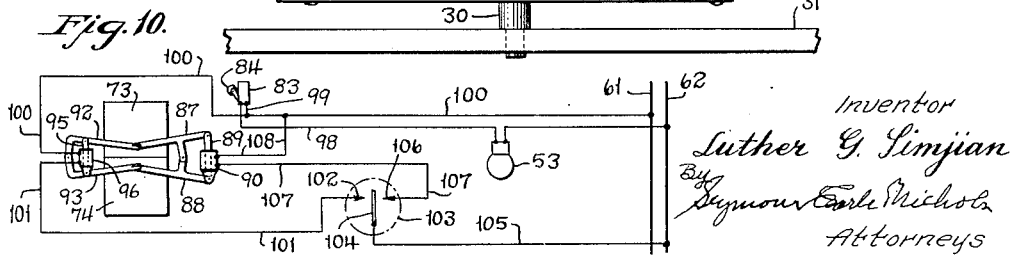

Patented Jan. 20, 1953

2,625,857

UNITED STATES PATENT OFFICE 2,625,857

POSE-REFLECTING PHOTOGRAPHIC APPARATUS

Luther G. Simjian, Riverside, Conn.

Application July 26, 1949, Serial No. 106,783

6 Claims. (Cl. 88—74)

1

The present invention relates to photographic apparatus and relates more particularly to pose-reflecting photographic apparatus, i. e., photographic apparatus which will enable a poser being photographed to observe his pose which a camera will photograph, to thus enable such person to modify or alter the pose to secure the most gratifying results in the ultimate photographs.

Heretofore it has been the most general practice in photographic apparatus of the character above referred to, to employ a movable mirror having an aperture therein through which a person is photographed. The aperture referred to has been normally out of registry with an imaginary line extending between the poser and the camera and has been caused to move past the said line to enable the said camera to record the image of the person through the moving aperture. A considerable and very often variable time factor is involved between the time of the initiation of the movement of the apertured mirror and the time when its aperture moves past the lens of the camera.

The above described construction and arrangement of parts has been open to many objections, among which may be mentioned that of substantially precluding, in a practical sense, the employment of highly-desirable flashlight photography.

One of the main objects of the present invention is to provide a superior pose-reflecting photographic apparatus which will perform consistently and satisfactorily in connection with flashlight illumination of the poser.

Another object of the present invention is to provide a superior pose-reflecting photographic apparatus capable of utilizing either shutterless or shuttered cameras to record the image of a poser.

Still another object of the present invention is to provide a superior pose-reflecting photographic apparatus, by means of which either time-exposure or flashlight pictures may be taken of a poser without requiring the reorganization of the parts of the apparatus.

In general, the present invention consists in providing a pose-reflecting photographic apparatus whereby two complemental mirrors in substantially parallel planes cooperate to conceal the camera from the poser and to jointly reflect a substantially unbroken image of the poser away from the camera and toward the poser. By the term "parallel planes" as employed hereinabove and in the claims, it is intended to include the arrangement where the planes of the two mirrors lie in the same plane. In concealing the camera

2 from the poser, the mirrors, of course, interrupt the light path to the lens of the camera. Therefore, in order for the camera to record an image of the poser, the mirrors are separated to form a gap or opening through which light may pass to the camera. A primary feature and advantage of this invention lies in the provision that the point of separation between the two mirrors lies substantially within the light path to the camera lens. This ensures a minimum amount of delay in producing the necessary gap between the mirrors, thereby almost eliminating the time in which the poser might inadvertently change his desired pose. Furthermore, since the mirrors do not have to move any considerable distance before they begin to uncover the lens, the actual movement of the mirrors themselves is comparatively small.

From the foregoing it becomes apparent that another advantage of the present invention is in providing that the period of time of the exposure may be varied, if desired, either by the relative movement between the complemental mirrors or by the camera shutter.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view in front elevation of a preferred form of pose-reflecting photographic apparatus embodying the present invention;

Fig. 2 is a broken view in rear elevation on a larger scale than Fig. 1 omitting the camera and showing parts of the cabinet in vertical section;

Fig. 3 is a broken horizontal sectional view taken on the line 3—3 of Fig. 1, but on a larger scale;

Fig. 4 is a broken detail sectional view taken on the line 4—4 of Fig. 2, but on a larger scale;

Fig. 5 is a broken detail sectional view taken on the line 5—5 of Fig. 2;

Fig. 6 is a diagrammatic view illustrating the preferred electrical connections between the various features;

Fig. 7 is a broken horizontal sectional view taken on the line 7—7 of Fig. 8 and showing a modified form of the present invention;

Fig. 8 is a broken view in rear elevation of the showing of Fig. 7, but with the camera and rear light-shield omitted;

Fig. 9 is a broken detail sectional view taken on the line 9—9 of Fig. 8; and

Fig. 10 is a diagrammatic view illustrating the preferred electrical connections between the various features of the structure of Figs. 7 and 8.

*The photographic apparatus of Figs. 1 to 6 inclusive*

The apparatus now to be described includes a cabinet generally designated by the reference character 10 and shown in Fig. 1 from the position which a poser would occupy. In horizontal section, the cabinet includes a central panel 11 having a central aperture 12 therein preferably of rectangular form. Respectively sloping outwardly in opposite directions from the respective outer edges of the central panel 11 are wing panels 13 and 14 diverging from each other as is especially well shown in Fig. 3. The wing panels 13 and 14 are respectively formed with profile-viewing apertures 15 and 16 arranged in horizontal alignment with the central aperture 12, previously referred to.

The outer edges of the sloping wing panels 13 and 14 are respectively connected by means of narrow front panels 17 and 18 to two side panels 19 and 20. The said side panels 19 and 20 respectively extend rearwardly in parallelism with each other from the outer edge portions of the front panels 17 and 18, as is especially well shown in Fig. 3. In Fig. 3, the rear portions of the side panels 19 and 20 are shown as broken away and it will be apparent, however, that they may be continued to the desired extent to form a complete housing, if desired.

The position which a poser would normally occupy is represented in Fig. 3 by the reference character P, so that the poser may look directly through the central aperture 12 and thence through a double-concave reducing-lens 21 at two complemental pose-reflecting mirrors 22 and 23 which will be presently described in more detail. The poser P may also look through either of the profile-viewing apertures 15 and 16 to view his semi-profile in either of two profile-viewing mirrors 24 and 25 respectively located adjacent the side panels 19 and 20. The mirrors 24 and 25 are so positioned as to reflect to a poser an image of himself as jointly received by the pose-reflecting mirrors 22 and 23 and reflected by them to the profile-viewing mirrors 24 and 25, depending upon which direction the said mirrors 22 and 23 are turned, all in a manner as will hereinafter appear.

The pose-reflecting mirrors 22 and 23 are located one above the other as is indicated in Fig. 2 and are respectively mounted in vertically-movable mirror-carriers respectively designated by the reference characters 26 and 27 and which may be conveniently formed of aluminum castings. Extending vertically through the respective opposite edge portions of the mirror-carriers 26 and 27 are two laterally-spaced-apart and parallel guide-rods 28—28 rigidly connected together at their respective upper and lower ends by tie-bars 29—29 as will be seen by reference to Fig. 2 in particular. The guide-rods 28—28 thus provide mirror-guiding means for guiding the movements of the mirrors 22 and 23 with respect to each other in a manner as will hereinafter appear.

Rigidly secured to and extending centrally downwardly from the lower tie-bar 29—29 is a lower pivot-stud 30 turning in the central portion of a supporting-bar 31 extending transversely between the side panels 19 and 20 of the cabinet 10 and supported in turn by the said side panels, as is shown in Fig. 2.

Rigidly secured to and extending upwardly from the upper tie-bar 29 in axial alignment with the pivot-stud 30 is an upper pivot-stud 32 turning at its upper end in a supporting-bar 33 also extending transversely between and supported by the side panels 19 and 20. The pivot-stud 32 extends through a disk 34 and rigidly clamps the same to the upper surface of the upper tie-bar 29 as is especially well shown in Fig. 4. The said disk is provided in its periphery with three circumferentially-spaced-apart detent-notches as is indicated in Fig. 3 and which notches are selectively adapted to receive a detent-plunger 35 normally pressed inwardly toward the disk 34 by a spring 36 (Fig. 4). The said detent-plunger is mounted for reciprocation in the outer end of an arm 37 rigidly mounted at its inner end upon the central portion of the pivot-stud 32.

The pose-reflecting mirrors 22 and 23 have their juxtaposed edges normally abutted as is indicated in Fig. 5, so that their respective front surfaces are in a common plane. Preferably, the said mirrors 22 and 23 are formed of metal and have their front faces (toward the poser P) provided with reflecting-surfaces produced by vapor-depositing thereon aluminum or other suitable material. The said mirrors, if desired, may be formed of glass or its equivalent and may be provided with silvering or the like on their rear surfaces, though the previously-mentioned type of mirrors is preferred.

For the purpose of concurrently moving the pose-reflecting mirrors 22 and 23 vertically toward and away from each other, the upper mirror 22 is provided centrally adjacent its lower edge with a rearwardly-extending stud or pin 38, and the lower mirror 23 is provided centrally adjacent its upper edge with a similar stud or pin 39 as is indicated in Figs. 2 and 5.

The studs or pins 38 and 39 respectively on the pose-reflecting mirrors 22 and 23 respectively extend through the bifurcated inner ends of two similar mirror-operating levers 40 and 41 which are of substantially T-shaped form, as will be apparent by reference to Fig. 2. Intermediate their respective opposite ends, the levers 40 and 41 are mounted for concentric pivotal movement upon a pivot-stud 42 (Fig. 2) extending rearwardly from the central portion of a yoke 43. The yoke 43 is of U-shaped form and is pinned or otherwise rigidly attached to the adjacent one of the vertical guide-rods 28.

The extreme outer end of the upper mirror-operating lever 40 has pivoted thereto an armature 44 extending downwardly into the interior of a solenoid 45. The lower end of the solenoid is, in turn, pivotally connected to the extreme outer end of the lower mirror-operating lever 41 in such manner that when the solenoid 45 is energized, the said lever 41 will be swung in a counterclockwise direction (as viewed in Fig. 2); while the companion upper mirror-operating lever 40 will be turned in a clockwise direction around the pivot-stud 42 to thus coincidentally raise the upper pose-reflecting mirror 22 and lower the lower pose-reflecting mirror 23.

For the purpose of restoring the pose-reflecting mirrors 22 and 23 to their normally abutting relationships after they have been separated by energizing the solenoid 45, there is provided a helical spring 46 (Fig. 2) which is coupled at its respective opposite ends to the upper mirror-operating lever 40 and the lower mirror-operating lever 41 adjacent the pivot-stud 42.

For purposes of insuring substantial equality in the movements of the pose-reflecting mirrors 22 and 23, inter-connecting cables, cords or bands 47 and 48 are provided. The upper cord 47 extends around a pulley 49 carried by the upper tie-bar 29 and has one end attached to the upper mirror-carrier 26 and its other end attached to the lower mirror-carrier 27. The companion or lower cord 48 extends around a pulley 50 carried by the lower tie-bar 29 and has one of its ends connected to the lower mirror-carrier 27 and its opposite end connected to the upper mirror-carrier 26.

Carried by the upper tie-bar 29 adjacent one end thereof is a switch generally designated by the reference character 51 and which may be of any suitable form and which, in the present instance, has projecting therefrom a switch-arm 52 adapted to be engaged and pressed by the adjacent upper corner-portion of the mirror-carrier 26 when the same is raised by the solenoid 45.

Mounted in the central panel 11 of the cabinet 10 above the central aperture 12, is an electric light 53 which is preferably of the repeat-flash type, though the same may be a photo-flood lamp or any other suitable electric illuminator, if desired.

Mounted to the rear of the pose-reflecting mirrors 22 and 23 in any suitable manner, is a camera generally designated by the reference character 54. The said camera is directed forwardly, preferably with its lens-system aligned with the central portions of the juxtaposed edges of the pose-reflecting mirrors 22 and 23 when the same are in engagement, so as to photograph a poser when the said mirrors are separated in a manner as will hereinafter appear. As is indicated in Figs. 3 and 6, the camera 54 has projecting from it the usual shutter-operating arm 55, to the outer end of which is pivotally connected the adjacent end of an armature 56 surrounded by a solenoid 57. The end of the armature 56 opposite the arm 55 is adapted to engage a switch-arm 58 forming a feature of a switch 59 preferably similar in character to the switch 51 before referred to.

One terminal of the switch 59 is connected by means of a wire 60 to a supply-wire 61 leading, together with a companion supply-wire 62, from a suitable source of electrical current such, for instance, as an electric storage battery or, if desired, a source of alternating current. The remaining terminal of the switch 59 is connected by means of a wire 63 (Fig. 6) to one terminal of the electric light 53. The remaining terminal of the said light is connected by means of a wire 64 to the supply-wire 62.

As is schematically indicated in Fig. 6, one terminal of the solenoid 57 is connected by means of a wire 65 to one terminal of the switch 51. The remaining terminal of the switch 51 is connected by means of a wire 66 to the supply-wire 61. The remaining terminal of the solenoid 57 is connected by means of a wire 67 to the supply-wire 62.

The solenoid 45 which serves to effect the separation of the pose-reflecting mirrors 22 and 23, has one of its terminals connected by means of a wire 68 to the supply-wire 62, while the remaining terminal of the said solenoid is connected by means of a wire 69 to the companion supply-wire 61. Interposed in the wire 69 just referred to is a manually-operable switch generally designated by the reference character 70. The said switch 70 is preferably manually operable under most conditions but, if desired, an automatic time-switch may be substituted therefor, as is well-known in the art.

*The operation of the apparatus of Figs. 1 to 6 inclusive*

For purposes of description, let it be assumed that a poser is positioned at P and that it is desired to make a substantially front-face view of such poser. Under these conditions, the framework comprising the guide-rods 28—28, tie-bars 29—29 and associated parts will be turned on its pivot-studs 30 and 32 so as to bring the pose-reflecting mirrors 22 and 23 into an intermediate plane which is substantially perpendicular to the line of sight of the poser.

The poser gazing through the central aperture 12 of the cabinet 10 will see a reflection of his image jointly from the two pose-reflecting mirrors 22 and 23 which latter at this time have their adjacent edges closely abutted. The image seen by the poser will be reduced from normal by the reducing-lens 21 as is preferred. However, even in the absence of the reducing-lens, the fine line of contact between the abutting edges of the pose-reflecting mirrors 22 and 23 will be almost unnoticeable, since the poser, when focusing his eyes to receive the reflection of his image, will not focus upon the line of contact referred to.

When the pose is satisfactory, the switch 70 may be closed to thus energize the solenoid 45. The energization of the solenoid 45 will rock the mirror-operating levers 40 and 41 respectively in opposite directions, thereby simultaneously separating the normally-abutting edges of the pose-reflecting mirrors 22 and 23 to provide a gap therebetween through which a photograph of the poser may be taken.

As the upper pose-reflecting mirror 22 approaches the limit of its upward movement, its mirror-carrier 26 will engage the switch-arm 52 of the switch 51, thereby energizing the solenoid 57. The energization of the solenoid 57 as just described, will cause its armature 56 to move from left to right (as viewed in Figs. 3 and 6), with the result that the shutter-operating arm 55 of the camera 54 will be operated to open the shutter of the said camera. After effecting the opening of the shutter of the camera 54 as just described, the armature 56 will actuate the switch-arm 58 to close the circuit through the electric light 53 or its equivalent, to thus energize the same and illuminate the poser, whose image will be promptly recorded by the camera 54.

When the switch 70 is now opened, the spring 46 between the levers 40 and 41 will be free to assert itself and again restore the pose-reflecting mirrors 22 and 23 to the positions in which they are indicated by full lines in the drawing.

From the foregoing, it will be apparent that since the pose-reflecting mirrors 22 and 23 are separated before the shutter of the camera 54 is opened, and further that the said shutter is opened before the electric light 53 or its equivalent is energized, it is possible to have the apparatus function to effect flashlight photography or, on the other hand, to effect time-exposure photography, if such be desired.

If desired, the pose-reflecting mirrors 22 and 23 may both be in the form of "transparent" mirrors well-known in the art and which (when the area to their rear is kept in darkness) effectively reflect frontally. Such transparent mirrors would permit the camera 54 or its equivalent to have its focus adjusted when desired, since sufficient light will come through the said mirrors to permit this adjustment.

Should it be desired to photograph the right semiprofile of the poser, and also enable the poser to observe the image of himself which will be photographed, the entire mirror-carrying means comprising the parts 28—28, 29—29 together with the pose-reflecting mirrors 22 and 23 may be swung into the appropriate position by first withdrawing the detent-plunger 35 and thereafter swinging the unit referred to around the pivot-studs 30 and 32 as centers until the parts assume the angular positions in which they are indicated by the broken lines A, Fig. 3. The detent-plunger 35 may now be released and utilized to hold the parts in the position just referred to.

Under the conditions above described, the poser will glance through the profile-viewing aperture 15 at his left and thus see the image of himself in the profile-viewing mirror 24 which latter, in turn, receives it from the cooperating pose-reflecting mirrors 22 and 23. The said mirrors 22 and 23 may be separated in the manner previously described and the photograph taken.

Should the poser wish to have his left semiprofile photographed, the elements 28—28, 29—29 and associated features may be swung into the position B indicated in Fig. 3, whereupon the poser may observe his reflection in the profile-viewing mirror 25 and the photograph taken in the same manner as has been previously described.

*The photographic apparatus of Figs. 7 to 10 inclusive*

In the apparatus previously described, the pose-reflecting mirrors were opened by means of a solenoid and were closed into abutting relationship by spring-means. In the structure now to be described, the complemental pose-reflecting mirrors are positively moved in both directions and have a slightly different relationship—all as will be presently described.

In the structure now being described, the same frame-work comprising the guide-rods 28—28 and tie-bars 29—29 is employed. The said frame-work is mounted for pivotal movement about a vertical axis, in the support-bars 31 and 33 previously described.

Mounted for vertical sliding movement at their respective opposite sides on the guide-bars 28—28 are two complemental mirror-carriers 71 and 72 respectively carrying complemental pose-reflecting mirrors 73 and 74, with the upper mirror 73 arranged so that its front surface is in vertical alignment with the rear surface of the lower pose-reflecting mirror 74, as is indicated in Fig. 9. Normally, the lower edge-portion of the upper mirror 73 and the upper edge-portion of the lower mirror 74 are in overlapping relationship as is shown in Fig. 9. The mirror 74 has attached to the upper portion of the rear face, a horizontal plate 74a having its upper portion rearwardly offset to receive the lower edge of the upper mirror 73, which latter normally rests upon a resilient pad 74b. The construction and arrangement just described provides a light-tight joint between the mirrors 73 and 74.

For the purpose of insuring substantially-equal movements of the two complemental pose-reflecting mirrors 73 and 74, two interconnecting cables, cords or bands 75 and 76 are employed. The cable 75 or its equivalent is attached at one end to the upper end of the upper mirror-carrier 71 and extends upwardly around a pulley 77 carried by the upper tie-bar 29, thence downwardly where it is attached to the lower mirror-carrier 72, as is indicated in Fig. 8. The companion cable 76 has one end attached to the lower portion of the lower mirror-carrier 72 and extends reversely around a pulley 78 carried by the lower tie-bar 29. The opposite end of the cable 76 extends upwardly and is attached to the upper mirror-carrier 71 as is also indicated in Fig. 8.

Located rearwardly of the pose-reflecting mirrors 73 and 74 in substantial horizontal alignment with the central portions of their respective lower and upper edges, is a camera generally designated by the reference character 54. Interposed between the pose-reflecting mirrors 73 and 74 and the camera 54 is a front light-shield 79 of plate-like form and rigidly mounted at its respective opposite side edges upon the vertical guide-rods 28—28. The said light-shield 79 is formed with a central aperture 80 through which the camera 54 may record the image of a poser when the pose-reflecting mirrors 73 and 74 are separated in the manner as will hereinafter appear. The said front light-shield 79 is provided with a rearwardly-projecting flange 81 extending completely around its outer edges.

Interposed between the front light-shield 79 and the pose-reflecting mirrors 73 and 74 is a light-sealing strip 79a. The sealing-strip 79a is secured to the front face of the front light-shield 79 completely around the aperture 80 therein and serves to prevent any leakage of light between the front light-shield 79 and the pose-reflecting mirrors 73 and 74.

The flange 81 of the front light-shield 79 has secured to it the outer end of an accordion-pleated flexible rear light-shield 82 which extends to the front panel of the camera 54 rearwardly of the camera lens, to thus provide a light-tight compartment in conjunction with the front light-shield 79.

Carried by the upper tie-bar 29 adjacent one end thereof, is a switch generally designated by the reference character 83 having a projecting pivotal switch-arm 84 adapted to be engaged and pressed inwardly to close the switch by the adjacent upper portion of the upper mirror-carrier 71 when the same is raised.

The upper pose-reflecting mirror 73 is provided adjacent its lower edge with a rearwardly-projecting stud 85 arranged in vertical alignment with a similar stud 86 rearwardly projecting from the central upper portion of the lower pose-reflecting mirror 74, as is indicated in Fig. 8. The stud 85 extends rearwardly through the bifurcated inner end of a mirror-opening lever 87 comprising the complement of a similar but reversely-arranged mirror-opening lever 88 which has the stud 86 extending through its bifurcated inner end. The levers 87 and 88 are of T-shape form similar to the previously-described mirror-operating levers 40 and 41, and are pivotally connected intermediate their respective opposite ends to the front light-shield 79 and extend in part through the flange 81 of the said light-shield as is indicated in Fig. 7.

The extreme outer end of the mirror-opening lever 87 has pivotally connected to it an armature 89 extending downwardly into the interior of a solenoid 90. The lower end of the solenoid 90 is, in turn, pivotally connected to the extreme outer end of the lower mirror-opening lever 88. The respective outer ends of the levers 87 and 88 together with the armature 89 and the solenoid 90 are enclosed within a light-proof housing 91 secured to the adjacent side of the front light-shield 79.

The rearwardly-projecting stud 85 of the upper pose-reflecting mirror 73 also extends through the bifurcated inner end of an L-shaped mirror-closing lever 92, complementing a similar but reversely-arranged mirror-closing lever 93 having its bifurcated inner end receiving the stud 86 of the lower pose-reflecting mirror 74. The levers 92 and 93 just referred to project through a suitable opening in the adjacent portion of the side flange 81 of the light-shield 79 and have their extreme outer ends pivoted about a common center to an arm 94 extending outwardly from the adjacent portion of the side flange 81 of the light-shield 79.

Pivotally connected to the upper mirror-closing lever 92 intermediate the respective opposite ends thereof is an armature 95 extending downwardly into the interior of a solenoid 96. The lower end of the solenoid 96 is, in turn, pivotally connected to the mirror-closing lever 93 intermediate the respective opposite ends thereof. The armature 95 and solenoid 96 together with the arm 94 and the outer ends of the levers 92 and 93 are accommodated within a light-tight housing 97 secured to the adjacent portion of the flange 81 of the front light-shield 79.

The apparatus illustrated in Figs. 7 to 10 inclusive, may be housed within a suitable cabinet such, for instance, as the previously described cabinet 10 having an electric light such as 53 indicated in the wiring diagram of Fig. 10.

As in the previous instance, one terminal of the electric lamp 53 is connected by means of the wire 64 to the supply-wire 62, while the other terminal of the said lamp is connected by means of a wire 98 to one terminal of the switch 83. The remaining terminal of the switch 83 is connected by means of a wire 99 to a wire 100 leading from the supply-wire 61 to one terminal of the solenoid 96. The remaining terminal of the solenoid 96 is connected by means of a wire 101 to one contact 102 of a double-throw switch generally designated by the reference character 103. The swinging-blade 104 of the switch 103 is connected by means of a wire 105 to the supply-wire 62. The wire 100 previously referred to and leading from the supply-wire 61, also extends to the terminal of the solenoid 96 opposite the terminal to which the wire 101 is connected.

The contact 106 of the switch 103 is connected by means of a wire 107 to one terminal of the solenoid 90. The remaining terminal of the said solenoid is connected by means of a wire 108 to the wire 100 leading from the supply-wire 61.

The camera 54 previously described may, if desired, be of the shutterless type, inasmuch as its lens is normally contained within a light-tight chamber formed by the front light-shield 79 and the rear light-shield 82.

When it is desired to record the image of a poser, the switch-blade 104 of the switch 103 may be swung into engagement with the contact 106, thereby energizing the solenoid 90 and causing the latter to separate the pose-reflecting mirrors 73 and 74 sufficiently to permit the camera 54 to record the image of the poser. When the upper pose-reflecting mirror 73 approaches the limit of its upward movement, it will actuate the switch-arm 84 of the switch 83, thereby closing the circuit through the electric light 53 to thus illuminate the poser. By reversely swinging the blade 104 of the switch 103 so as to engage it with the contact 102, the solenoid 90 will be deenergized and the solenoid 96 will be energized to positively restore the pose-reflecting mirrors 73 and 74 to the positions in which they are shown in Figs. 8 and 9.

The entire framework comprising the guide-rods 28—28 and tie-bars 29—29 together with the parts carried thereby, may be pivoted about pivot-studs 30 and 32 in the same manner as was described in connection with the apparatus of Figs. 1 to 6 inclusive, so as to enable the poser to observe either his right or left semi-profile prior to the taking of the photograph. This turning movement is made possible by the flexibility of the rear light-shield 82.

It is preferred, as is shown and described, to reversely move both of the complemental pose-reflecting mirrors such as 22—23 and 73—74, though, if desired, one mirror of each complemental pair may be left stationary and its companion only moved, in which case, the level of the lens-system of the camera would be appropriately adjusted.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A pose reflector for use with a camera having a lens, comprising two complemental mirror sections having adjacent edges, respectively, shaped to match each other, and substantially parallel reflector surfaces, respectively, extending transversely of the axis of the camera lens and facing away from the camera; means for guiding at least one of said mirror sections for movement in the plane of its reflector surface to and from a reflecting position in which said adjacent edges of the mirror sections meet in matching relation with each other and pass substantially within the light path to the camera lens, so that said mirror sections together present a substantially uninterrupted reflector surface in said reflecting position; and means for moving said one mirror section to and from said reflecting position.

2. A pose reflector for use with a camera having a lens, comprising two complemental mirror sections arranged in a common plane extending transversely of the lens axis of the camera, said mirror sections having adjacent edges, respectively, fittable against each other, and reflector surfaces, respectively, facing away from the camera; means for guiding at least one of said mirror sections for edgewise movement in said common plane to and from a reflecting position in which said adjacent edges of the mirror sections fit against each other and pass substantially within the light path to the camera lens, so that said mirror sections together present a substantially uninterrupted reflector surface in said reflecting position; and means for moving said one mirror section to and from said reflecting position.

3. A pose reflector for use with a camera having a lens, comprising two complemental mirror sections having adjacent edges, respectively, shaped to match each other, and substantially parallel reflector surfaces, respectively, extending transversely of the axis of the camera lens and facing away from the camera; means for guiding said mirror sections for movement in the planes of their respective reflector surfaces to and from a reflecting position in which said adjacent edges of the mirror sections meet in matching relation with each other and substantially intersect the lens axis of the camera, so that said mirror sections together present a substantially uninterrupted reflector surface in said reflecting position; and means for simultaneously moving said mirror sections in opposite directions, respectively, to and from said reflecting position.

4. A pose reflector for use with a camera having a lens, comprising complemental mirror sections arranged in a common plane extending transversely of the lens axis of the camera, said mirror sections having adjacent edges, respectively, fittable against each other, and reflector surfaces, respectively, facing away from the camera; means for guiding said mirror sections for edgewise movement in said common plane; and means for simultaneously moving said mirror sections in opposite directions, respectively, in said plane to and from a reflecting position in which their adjacent edges, respectively, fit against each other and substantially intersect the lens axis of the camera, so that said mirror sections together present an uninterrupted reflector surface in their reflecting position.

5. A pose reflector for use with a camera having a lens, comprising complemental mirror sections arranged in a common plane at right angles to the lens axis of the camera, said mirror sections having adjacent edges, respectively, fittable against each other, and reflector surfaces, respectively, facing away from the camera; means for guiding said mirror sections for edgewise movement in said common plane; and means for simultaneously moving said mirror sections in opposite directions, respectively, in said plane to and from a reflecting position in which their adjacent edges, respectively, fit against each other and substantially intersect the lens axis of the camera, so that said mirror sections together present an uninterrupted reflector surface in said reflecting position.

6. A pose reflector for use with a camera having a lens and a shutter, comprising two complemental mirror sections having adjacent edges, respectively, shaped to match each other, and substantially parallel reflector surfaces, respectively, extending transversely of the axis of the camera lens and facing away from the camera; means for guiding said mirror sections for movement in the planes of their respective reflector surfaces to and from a reflecting position in which said adjacent edges of the mirror sections meet in matching relation with each other and substantially intersect the lens axis of the camera, so that said mirror sections together present a substantially uninterrupted reflector surface in said reflecting position; and means for simultaneously moving said mirror sections in opposite directions, respectively, to and from said reflecting position.

LUTHER G. SIMJIAN.

REFERENCES CITED

The following references are of record in the file of this patent:

UNITED STATES PATENTS

| Number | Name | Date |
|---|---|---|
| 343,367 | Froome | June 8, 1886 |
| 1,284,492 | Thomas | Nov. 12, 1918 |
| 1,709,598 | Simjian | Apr. 16, 1929 |
| 1,918,047 | Marchand | July 11, 1933 |
| 1,926,657 | Simjian | Sept. 12, 1933 |
| 2,017,514 | Simjian | Oct. 15, 1935 |
| 2,143,926 | Simjian | Jan. 17, 1939 |
| 2,590,101 | Henschke et al. | Mar. 25, 1952 |